United States Patent
Alecci et al.

(10) Patent No.: US 9,137,287 B2
(45) Date of Patent: Sep. 15, 2015

(54) HIGH AVAILABILITY FOR VOICE ENABLED APPLICATIONS

(75) Inventors: Anthony J. Alecci, Landing, NJ (US); Joel M. Ezell, Broomfield, CO (US); Mahesh Narasimhan, Broomfield, CO (US); Vivekananda Velamala, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 1664 days.

(21) Appl. No.: 11/511,592

(22) Filed: Aug. 28, 2006

(65) Prior Publication Data

US 2008/0052344 A1 Feb. 28, 2008

(51) Int. Cl.
| | |
|---|---|
| G06F 15/16 | (2006.01) |
| H04L 29/06 | (2006.01) |
| H04M 3/12 | (2006.01) |
| H04M 3/50 | (2006.01) |
| H04L 29/14 | (2006.01) |
| H04M 3/523 | (2006.01) |
| H04M 3/493 | (2006.01) |
| H04L 29/08 | (2006.01) |

(52) U.S. Cl.
CPC ............... *H04L 65/80* (2013.01); *H04L 69/40* (2013.01); *H04M 3/12* (2013.01); *H04M 3/50* (2013.01); *H04L 67/327* (2013.01); *H04M 3/493* (2013.01); *H04M 3/523* (2013.01)

(58) Field of Classification Search
CPC ....... H04M 3/493; H04M 3/523; H04M 3/12; H04M 3/50; H04L 65/80; H04L 67/327; H04L 69/40

USPC ........................... 709/231, 227, 238; 370/399
See application file for complete search history.

(56) References Cited

U.S. PATENT DOCUMENTS

| | | | | |
|---|---|---|---|---|
| 5,212,784 | A * | 5/1993 | Sparks ............................... | 714/6 |
| 5,371,852 | A * | 12/1994 | Attanasio et al. ............. | 709/245 |
| 5,799,323 | A * | 8/1998 | Mosher et al. ................. | 707/202 |
| 6,266,335 | B1 * | 7/2001 | Bhaskaran ..................... | 370/399 |
| 6,314,465 | B1 * | 11/2001 | Paul et al. ...................... | 709/226 |
| 6,345,282 | B1 * | 2/2002 | Minyard ........................ | 707/204 |
| 6,378,129 | B1 * | 4/2002 | Zetts ................................ | 725/94 |
| 6,421,741 | B1 * | 7/2002 | Minyard ........................ | 713/375 |
| 6,470,389 | B1 * | 10/2002 | Chung et al. .................. | 709/227 |
| 6,587,866 | B1 * | 7/2003 | Modi et al. .................... | 718/105 |
| 6,691,165 | B1 * | 2/2004 | Bruck et al. ................... | 709/227 |
| 6,711,606 | B1 * | 3/2004 | Leymann et al. ............. | 709/203 |
| 6,779,039 | B1 * | 8/2004 | Bommareddy et al. ...... | 709/238 |
| 6,779,082 | B2 * | 8/2004 | Burger et al. ................. | 711/114 |

(Continued)

OTHER PUBLICATIONS

Weiss, David, "Redundancy Key to High Availability Voice Services", Pub. Jan 2005, http://www.tmcnet.com/cis/0105/redundancy-key-to-high-availability-voice-services.htm, pp. 1-4.*

*Primary Examiner* — Krista Zele
*Assistant Examiner* — James Forman
(74) *Attorney, Agent, or Firm* — Sheridan Ross P.C.

(57) ABSTRACT

The present invention provides methods and systems for providing high availability voice applications. More specifically, one or more applications may share an extension of a switch among each other. This allows each application to receive data from the switch without occupying additional extensions of the switch. A first application sharing the extension with a second application may be provided as a backup to the second application in case the second application fails. Thus, the second application does not represent a single point of failure for the overall system.

24 Claims, 8 Drawing Sheets

(56) References Cited

U.S. PATENT DOCUMENTS

| | | | |
|---|---|---|---|
| 6,801,604 B2 * | 10/2004 | Maes et al. | 379/88.17 |
| 6,850,982 B1 * | 2/2005 | Siegel | 709/227 |
| 6,862,613 B1 * | 3/2005 | Kumar et al. | 709/220 |
| 6,865,597 B1 | 3/2005 | Bandopadhyay et al. | |
| 6,928,485 B1 * | 8/2005 | Krishnamurthy et al. | 709/242 |
| 7,142,661 B2 * | 11/2006 | Erhart et al. | 379/265.09 |
| 7,159,234 B1 * | 1/2007 | Murphy et al. | 725/87 |
| 7,251,745 B2 * | 7/2007 | Koch et al. | 714/11 |
| 7,330,860 B2 * | 2/2008 | Adiba et al. | 707/204 |
| 7,334,014 B2 * | 2/2008 | Moser et al. | 709/202 |
| 7,366,151 B2 * | 4/2008 | Kubler et al. | 370/338 |
| 8,073,129 B1 | 12/2011 | Kalavar | |
| 2002/0188624 A1 * | 12/2002 | Landin | 707/203 |
| 2004/0100970 A1 * | 5/2004 | Gerdisch et al. | 370/395.53 |
| 2004/0205372 A1 * | 10/2004 | Moser et al. | 714/1 |
| 2004/0268175 A1 * | 12/2004 | Koch et al. | 714/4 |
| 2005/0037787 A1 * | 2/2005 | Bachner et al. | 455/502 |
| 2006/0129695 A1 * | 6/2006 | Faibish et al. | 709/245 |
| 2007/0036332 A1 * | 2/2007 | Busayapongchai | 379/265.09 |

\* cited by examiner

HIGH AVAILABILITY FOR VOICE ENABLED APPLICATIONS

FIELD OF THE INVENTION

The invention relates generally to communication systems. More particularly, the invention relates to a system structure for providing high availability voice enabled applications.

BACKGROUND

Companies today rely to an unprecedented extent on online, frequently accessed, constantly changing data to run their businesses. Unplanned events that inhibit the availability of data and applications can seriously damage business operations. Therefore, when disaster strikes, companies must be prepared to eliminate or minimize data loss or application functionality.

Specifically, in the context of contact centers many applications (e.g., automated response units such as an Interactive Voice Response (IVR), Internet Protocol (IP) Call Recording, and other Session Initiation Protocol (SIP) voice applications) are called on regularly to conduct business operations. The importance of these applications to the contact center operation is so important that if one application were to fail important data and/or business may be lost and customer satisfaction may be negatively impacted. The performance of many contact centers is directly tied to revenues of the business and as many contact centers operate 24 hours a day, 7 days a week, it is very important that components of a call center offer high availability options to minimize down time.

With Reference to FIG. 1, an exemplary high availability application for a contact center according to the prior art is shown. Most high availability systems include a communication network 104, a switch 108, multiple servers 112a-b, and a database 116. A plurality of agent communication devices 124 are connected to the switch 108 via link(s) 126. Each server 112a and 112b is connected to the switch 108 via separate communication lines 110a and 110b respectively.

The first server 112a generally provides a first application to a contact received by the switch 108 and stores event and other state of the contact data in the database 116. The first server 112a further mirrors event data received from the switch 108 to the second server 112b in case the first server 112a fails. To minimize switch 108 endpoint identifier usage, the first server 112a is registered with the switch 108 while the second server 112b monitors the performance of the first server 112a by communication line 114. If the first server 112a fails, then the second server 112b registers with the switch 108 using the endpoint identifier that the first server 112a was previously using. The data and media are either sent directly to the first server 112a or the second server 112b. The data and media have to be mirrored if the alternate server wants to become aware of the other server's activity and state. The second server 112b also uses the data that has been mirrored to it from the first server 112a and begins fulfilling the role of the first server 112a. Mirroring is used so that both the first server 112a and the second server 112b do not need to be registered with the switch 108 at the same time. It is advantageous to save the number of endpoint identifiers required of the switch 108 since the switch 108 only has a limited number of endpoint identifiers to offer in creating a conference.

The cost for purchasing servers enabled with this mirroring capability is relatively large compared to the cost for purchasing servers without a mirroring capability. Also, these systems require a large amount of redesign to take full advantage of their features, which also increases their cost. A mirroring high availability application is suitable for many companies with a large budget. Unfortunately, companies and individuals still requiring high availability applications at a reduced cost that do not unnecessarily utilize switch 108 endpoint identifiers are left with few to no options.

SUMMARY

These and other needs are addressed by various embodiments and configurations of the present invention. The present invention is directed generally to a method and system for sharing endpoint identifiers of a switch. More specifically, data may be streamed from a switch to each endpoint using the common endpoint identifier at the same time such that low cost high availability server-enabled applications can be provided.

In accordance with one embodiment of the present invention, a method is provided. The method comprises the steps of:

(a) connecting a first contact with at least a first communication device through a switch;

(b) at least substantially simultaneously forwarding data associated with the first contact to first and second servers where the first and second servers are associated with a common endpoint identifier of the switch.

As used herein, a "contact" can include any type of resource request or communication including a voice call, email, chat, video call, fax, and combinations thereof. Accordingly, the servers may be equipped with any suitable application for processing and/or servicing such a contact.

Also, as used herein, an endpoint identifier is understood to include any type of location identifier. Examples of an endpoint identifier may include an extension, a SIP Uniform Resource Identifier (URI) such as a port number, Media Access Control (MAC) address, IP address, and any other type of identifier used in conferencing systems.

Generally the first and second servers are responsible for providing the same application to an incoming contact. Examples of applications that may be provided by the first and second servers include, without limitation, automated response applications, recording applications, voice messaging applications, emergency applications, signaling applications, media applications, and any other voice/video enabled application. In one embodiment, the second server provides a redundant copy of the application provided by the first server such that if the first server fails, the second server can replace the first server until it is repaired or replaced. In an alternative embodiment, the first server may correspond to a first intermediate server and the second server may correspond to a second intermediate server that are used as an intermediary between one or more application servers and the switch. By providing redundant servers downtime due to server failure or the like can be minimized.

In accordance with at least one embodiment, the first and second servers share an endpoint identifier so that each server receives the same data from the switch at the same time. This eliminates the need to mirror data between the servers, which can be costly and resource intensive. Rather, a single data stream is split and sent to each server. The servers receive the same data stream from the switch and each is ready to provide applications stored thereon to an incoming contact. Usually one server acts as the primary functioning server and the other server waits in an idle state until the primary server fails or becomes overloaded. The idle (secondary) server may remain in the idle state until it receives notification that the primary server has failed either from the switch, the primary server itself, or from a system administrator. However, while in the idle state the secondary server continues to receive data from the switch so that it can take over for the primary server at any time. When the primary server fails, the secondary server assumes the responsibilities of the primary server and the transition between servers is almost seamless since the secondary server has been receiving data from the switch the entire time.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using server(s), the invention is not limited to use with any particular type of communication system or configuration of system elements. Those skilled in the art will recognize that the disclosed techniques may be used in any communication application in which it is desirable to easily enhance the availability of voice applications.

Figure 1:
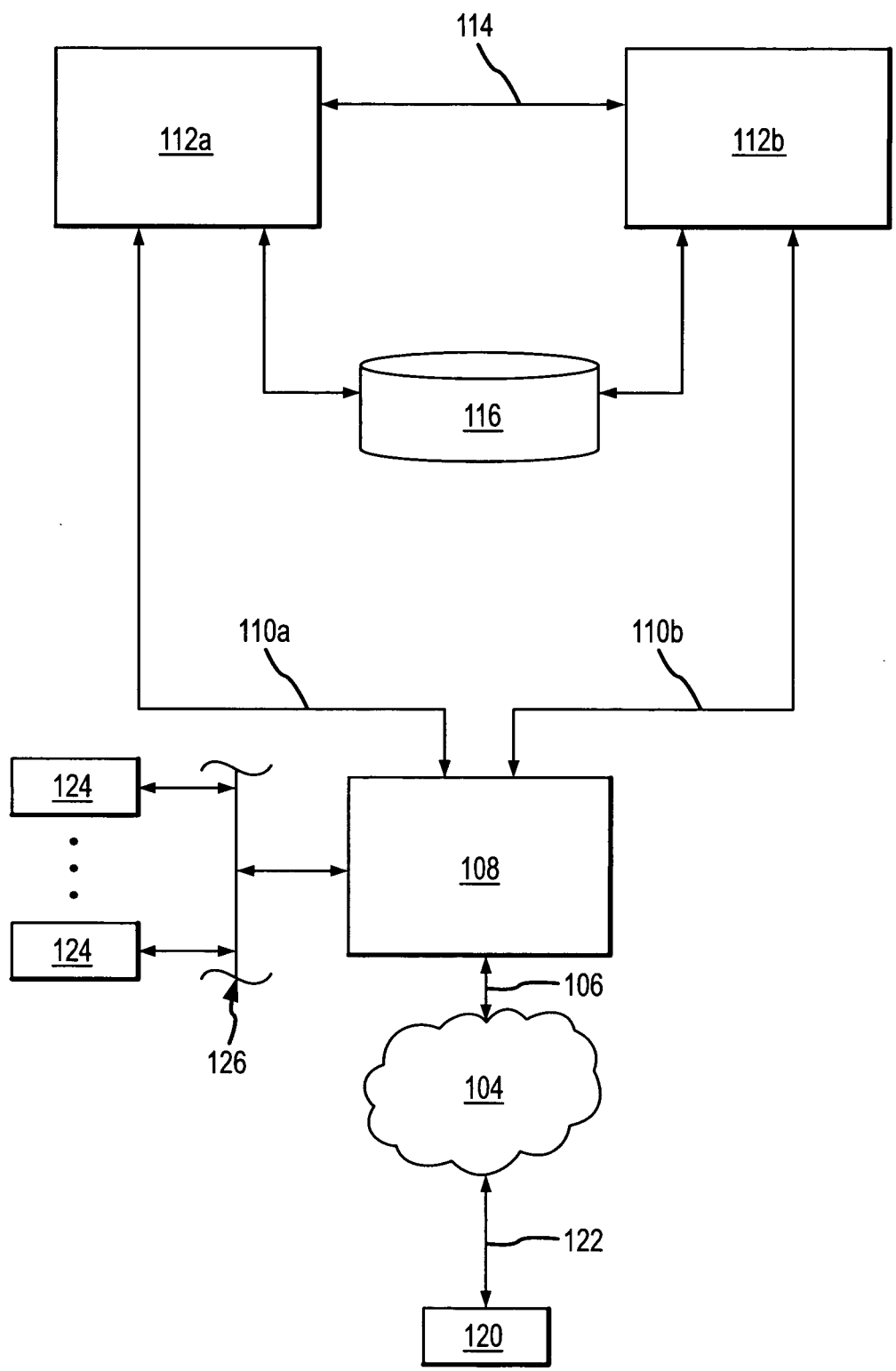
FIG. 1 depicts a communication system employing a high availability server configuration in accordance with embodiments of the prior art.
Figure 2:
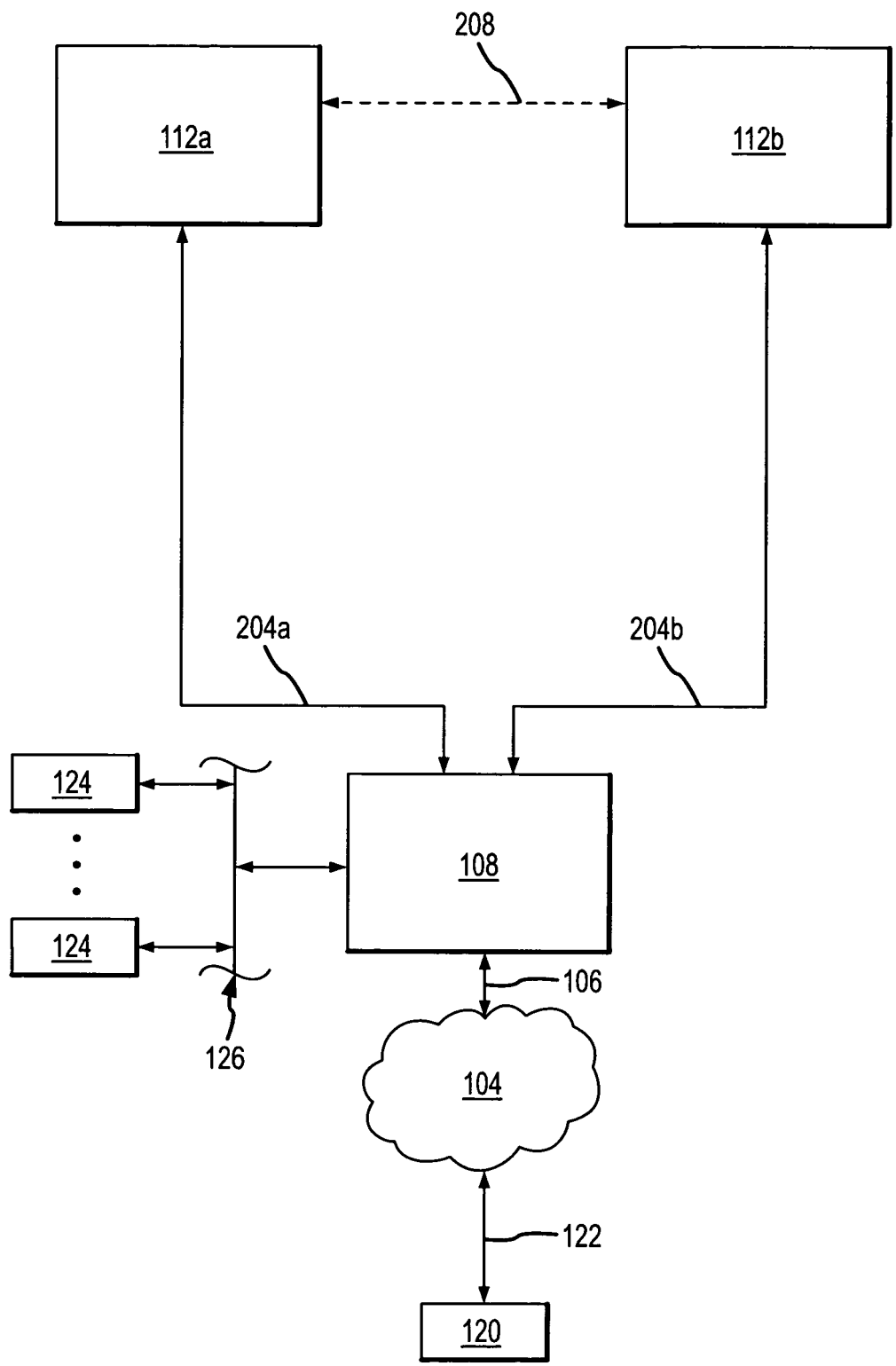
FIG. 2 depicts a communication system employing a first high availability server configuration in accordance with embodiments of the present invention.

Referring initially to FIG. 2, a first configuration of communication system elements will be described in accordance with at least some embodiments of the present invention. The system generally comprises a switch 108 connected to a communication network 104 via a plurality of trunks 106 and a plurality of agent communication devices 124 via link(s) 126.

One or more communication devices 120 are also connected to the communication network 104 by communication lines 122. The switch 108 connects the external communication device 120 with an agent communication device 124 by allocating an endpoint identifier to each device. When each device is registered with the switch 108 by an endpoint identifier, the switch 108 can pass information from the external communication device 120 to the agent communication device 124 and vice versa thus enabling communications between the communication devices.

The communication devices 120 and 124 may be packet-switched and/or circuit-switched and can include, for example, IP hardphones such as the Avaya Inc.'s 4600 Series IP Phones™, IP softphones such as Avaya Inc.'s IP Softphone™, Personal Digital Assistants (PDAs), Personal Computers (PCs), laptops, packet-based H.320 video phones and conferencing units, wired and wireless phones, and the like.

The servers 112a and 1112b are connected to the switch 108 through communication lines 204a and 204b respectively. The communication lines 204a and 204b may include a single communication line or may include communication network architecture. For example, the communication lines 204a and 204b may include a Local Area Network (LAN) or a Wide Area Network (WAN) such as the Internet. As will be appreciated, the servers 112a and 112b can include VoIP software, video call software, voice messaging software, recording software, an IP voice server, a fax server, a web server, an email server, and the like.

In accordance with embodiments of the present invention, the communication network 104, switch 108, servers 112a and 112b, and communication devices 120 and 124 are SIP compatible and can include interfaces for various other protocols such as a Lightweight Directory Access Protocol (LDAP), H.248, H.323, Simple Mail Transfer Protocol (SMTP), Internet Message Access Protocol 4 (IMAP4), Integrated Services Digital Network (ISDN), E1/T1, and analog line or trunk.

In one embodiment, both servers 112a and 112b comprise similar applications such that one server acts as a backup for the other server. The first server 112a has a first address (e.g., a first IP address) and the second server 112b has a second address (e.g., a second IP address). Both servers 112a and 112b can register with the switch 108 using a common endpoint identifier. Thus, the switch 108 is operable to send data to two different addresses using a single endpoint identifier. Since the data stream from the switch is forked to two different servers, the second server 112b is aware of all data sent to the first server 112a and vice versa.

The second server 112b may monitor the activity and performance of the first server 112a through the switch 108. Alternatively, an optional communication line 208 may be provided that allows the second server 112b to monitor the first server 112a directly. The second server 112b may also receive data that is transmitted from the first server 112a to the switch 108 in the event that the application on the first server 112a requires bidirectional communications between the switch 108 and server 112a. The data transmitted from the server 112a to the switch 108 may be provided to the second server 112b through the switch 108 or via the communication line 208.

In accordance with one embodiment, the endpoint identifier shared between the first and second servers 112a and 112b may be different from the endpoint identifier used for the agent communication device 124. In an alternative embodiment, the endpoint identifier shared between the first and second servers 112a and 112b may be the same endpoint identifier used for the agent communication device 124. This allows the switch 108 to use a single endpoint identifier to provide data to the agent communication device 124 and the servers 112a and 112b. If the agent communication device 124 shares an endpoint identifier with the servers 112, then a minimal number of endpoint identifiers are occupied during the interaction with the contact.

In one embodiment, a token may be passed between endpoints that are sharing a given endpoint identifier. The holder of the token is the endpoint designated to provide data back to the switch 108 and the communication device 120. For example, an agent may record a greeting that he/she gives every incoming contact on a record/playback application stored on one or both servers 112a and 112b. When a contact is assigned to that agent, the first server 112a may have the token and can play back the recorded greeting to the customer associated with the contact. Meanwhile, the agent and the second server 112b can monitor the conversation between the first server 112a and the customer. The agent can listen to the recording as it is provided to the customer and when the recording is complete the token may be passed to the agent's communication device 124. Then the agent is allowed to speak and interact with the customer and the servers 112a and 112b. The servers 112 can then monitor the interaction until their services are required.

The token may also be requested by the agent if he/she determines that the recording/playback or other application is no longer needed. The agent may press a button or say a particular keyword that indicates the token should be passed to the agent's communication device 124. Upon receiving the indication, the switch 108 may take the token from the first server 112a and provide it to the agent communication device 124.

Likewise, if the first server 112a fails it may pass the token to the second server 112b. Once in possession of the token the second server 112b may pick up right where the first server 112a left off. Alternatively, the token may be passed to the agent communication device 124 then the second server 112b may be designated as the primary server for the next incoming contact.

Of course there may be applications that do not require use of a token. For instance, unidirectional applications not requiring the server 112 to provide data back to the switch may not necessitate use of a token. Call recording applications are one example of a unidirectional application that may not require a token. Instead, both servers 112a and 112b may record the conversation between the agent and customer without needing to break into the conversation. In one embodiment, if the servers 112a and 112b are sharing an endpoint identifier with the agent communication device 124, then the servers will be transparent to the conversation and neither the agent nor the customer will be able to know that other endpoints are monitoring the conversation unless they are told. Usually the occupancy of an endpoint identifier can be used to determine if another party is present during a communication session. However, if the servers 112a and 112b are using the same endpoint identifier as the agent communication device 124, then such methods of identification cannot be used.

It should be noted that the invention does not require any particular type of information transport medium between the switch 108, server 112, and communication devices 120 and 124. The invention may be implemented with any desired type of transport medium as well as combinations of different types of transport channels.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 3:
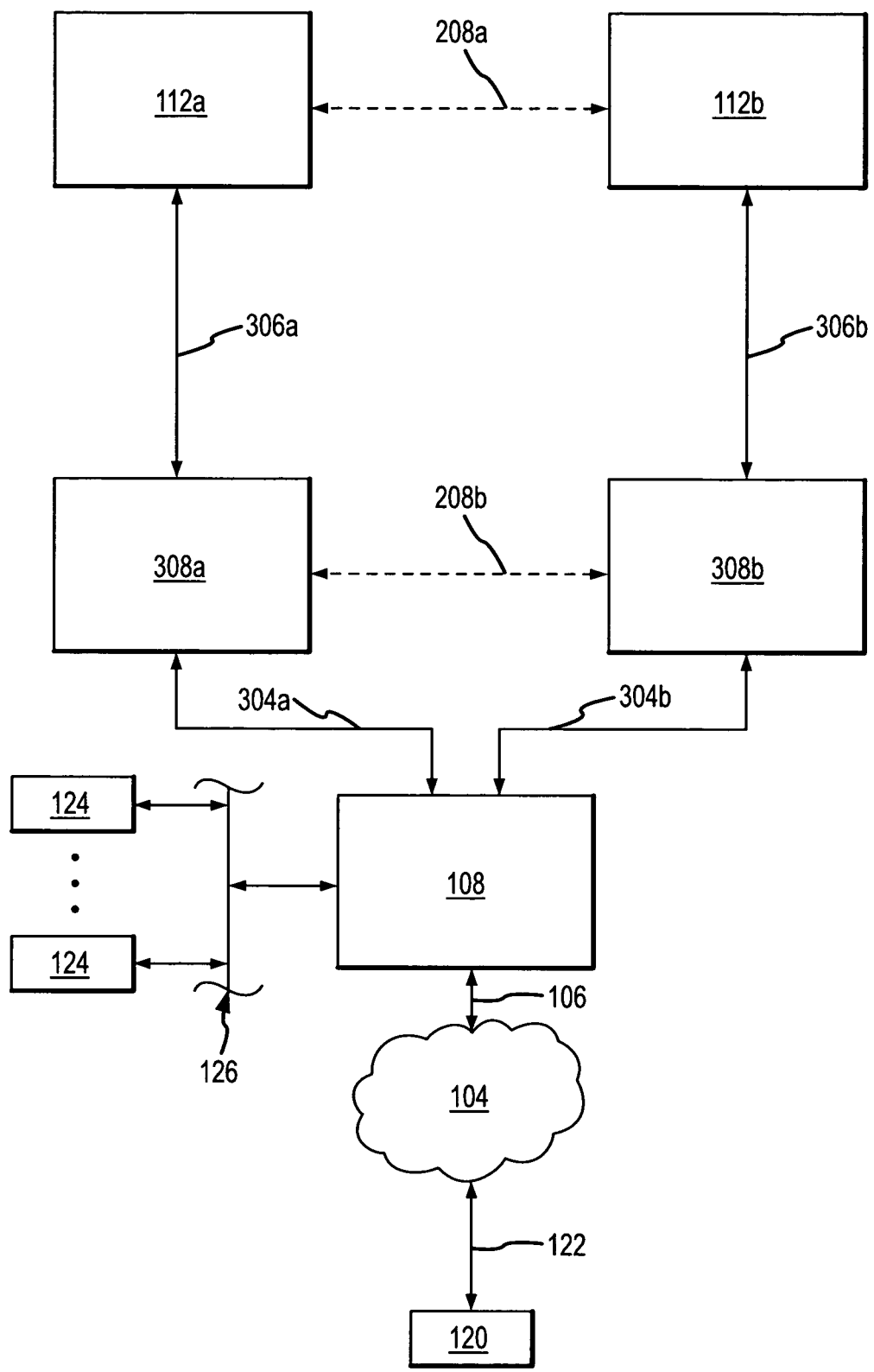
FIG. 3 depicts a communication system employing a second high availability server configuration in accordance with embodiments of the present invention.

Referring now to FIG. 3, a second configuration of communication system elements will be described in accordance with at least some embodiments of the present invention. In the depicted configuration, an intermediate server 308a and 308b may be provided for each application server 112a and 112b. The intermediate servers 308 may include functionality that allows various application servers to connect with the switch 108. In other words, the intermediate servers 308 may act as a communication interface for the application servers 112 and the switch 108. An example of an intermediate server 308 may include an Application Enablement Services (AES) server such as those produced and sold by Avaya Inc.

The intermediate server 308 may have a bank of virtual connections that appear to the switch 108 like a bank of endpoints with a unique phone number. When the application server 112 wishes to connect to the switch 108 it does so through the intermediate server 308 using one of the virtual connections. The servers 112a and 112b are connected to their associated intermediate server 308a and 308b through communication lines 306a and 306b. The intermediate servers 308a and 308b are then connected to the switch 108 via the communication lines 304a and 304b respectively. The communication lines 304a, 304b, 306a, and 306b may include a single communication line or may also include communication network architecture. For example, the communication lines 304a, 304b, 306a, and 306b may include a LAN or a WAN such as the Internet.

Similar to the stand-alone application servers described above, the intermediate servers 308a and 308b may share a single endpoint identifier when registering with the switch. Thus, data can be provided to both servers 308a and 308b by the switch 108 and the switch 108 only has to commit one endpoint identifier for both servers. Also, the shared endpoint identifier may be the same or different from the endpoint identifier used for the agent communication device 124.

The first application server 112a may also be connected to the second application server 112b through a first communication line 208a. This communication line allows one application server to monitor its peer's activity without going through the switch 108. Additionally, The first intermediate server 308a may be connected to the second intermediate server 308b through a second communication line 208b. The second communication line 208b affords the ability for each intermediate server 308 to monitor the activity of the other intermediate server. By using the communication lines 208a and/or 208b a backup server can determine if the primary server has failed and can therefore assume the responsibilities of the primary server immediately, thus making the transition between servers as seamless as possible.

During operation data is sent to both intermediate servers 308a and 308b. The data can then be kept there, transferred directly to the application servers 112a and 112b, or reformatted then provided to the requisite application server 112. The data provided by the switch may include downlink call control and/or device control data, voice data, video data, image data, and any other type of media data. In one embodiment, streaming media in the form of Real-time Transport Protocol (RTP) data bypasses the intermediate server 308 and is sent directly to the application server 112. On the other hand control data, usually in H.323 format, may be converted to Computer Supported Telecommunications Applications phase III (CSTA III) XML data by the intermediate server 308 before it is provided to the application server 112.

In accordance with one embodiment, the switch 108 interacts with both intermediate servers 308 and therefore both application servers 112 as if they were a single entity, via the single endpoint identifier. Therefore, control and media data is split to both servers 308a and 308b and ultimately sent to each application server 112a and 112b. Each instance of a duplicated application on each server 112 has its own control signal stream (e.g., H.323 signaling stream) and all downlink messages are sent to each of the signal streams. This allows duplicated servers to maintain the latest state, without any need for data mirroring between them. In other words, when the switch 108 sends state information by a single endpoint identifier, all servers 112 and 308 sharing that endpoint identifier receive the information. Thus, the switch 108 allows the servers 112 and 308 to operate at the same time and sends them the same data so that they are constantly synchronized.

Another advantage of providing data simultaneously to a number of servers is that a single point of failure is eliminated. If either the first application server 112a or the first intermediate server 308a fails, then the second intermediate server 308b and second application server 112b can take over. As can be appreciated by one of skill in the art, a greater number of redundant servers can be provided and may also be registered with the switch 108 using the same endpoint identifier. Up to N servers may be provided in addition to the first application server 112a, where N can be any number greater than or equal to one. Depending upon the importance of the application residing on the server and/or the required load placed on the server more backup servers may be provided.

As can be appreciated, some or all of the functionality of the intermediate servers 308 may reside on the switch 108 and/or in the application servers 112. The switch 108 may be designed to convert control data before it is transferred to the application servers 112 rather than requiring the use of an intermediate server 308.

Figure 4:
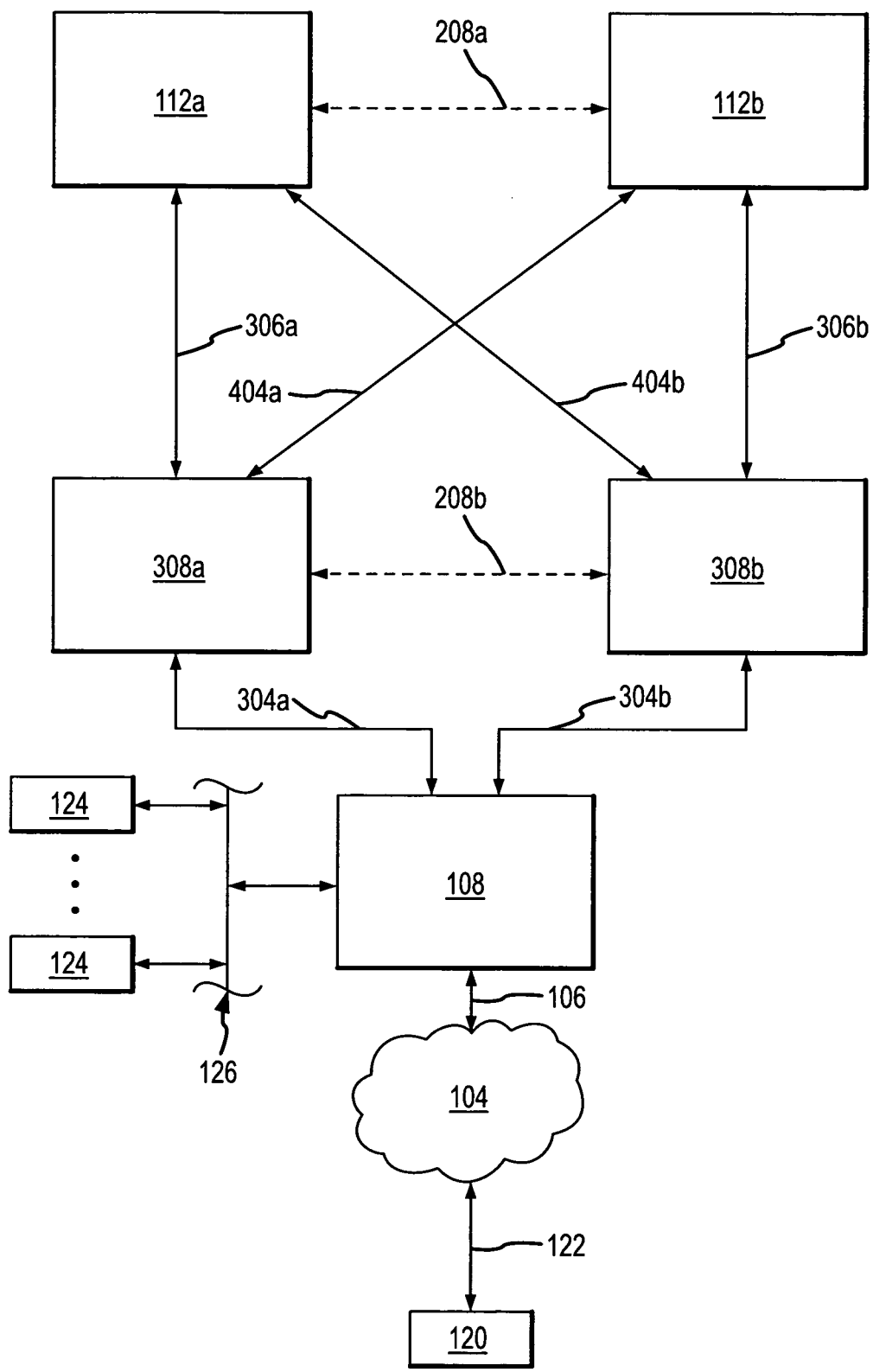
FIG. 4 depicts a communication system employing a third high availability server configuration in accordance with embodiments of the present invention.

Referring now to FIG. 4, a third configuration of communication system elements will be described in accordance with at least some embodiments of the present invention. This particular embodiment employs additional communication lines 404a and 404b. The first additional communication line 404a connects the first intermediate server 308a and the second application server 112b. The second additional communication line 404b connects the second intermediate server 308a and the first application server 112a. Similar to above, the intermediate servers 308a and 308b share an endpoint identifier. Using the shared endpoint identifier the switch 108 forks data to both intermediate servers 308a and 308b at the same time.

The additional connections 404 further reduce the chances for a single point of failure and also offer more configuration options in the event that an intermediate server 308 fails. For example, if the first intermediate server 308a fails, then the second intermediate server 308b can assume responsibilities of the first intermediate server 308a. However, if the first application server 112a is still operational, then data can be transmitted from the second intermediate server 308b to the first application server 112a and the first application server 112a can continue to operate as the primary application server. The second application server 112b may still continue to receive data from the second intermediate server 308b as well. To accomplish this, the second intermediate server may register to channels with the same endpoint identifier. The first channel may be dedicated to the first application server 112a and the second channel may be dedicated to the second application server 112b.

Figure 5:
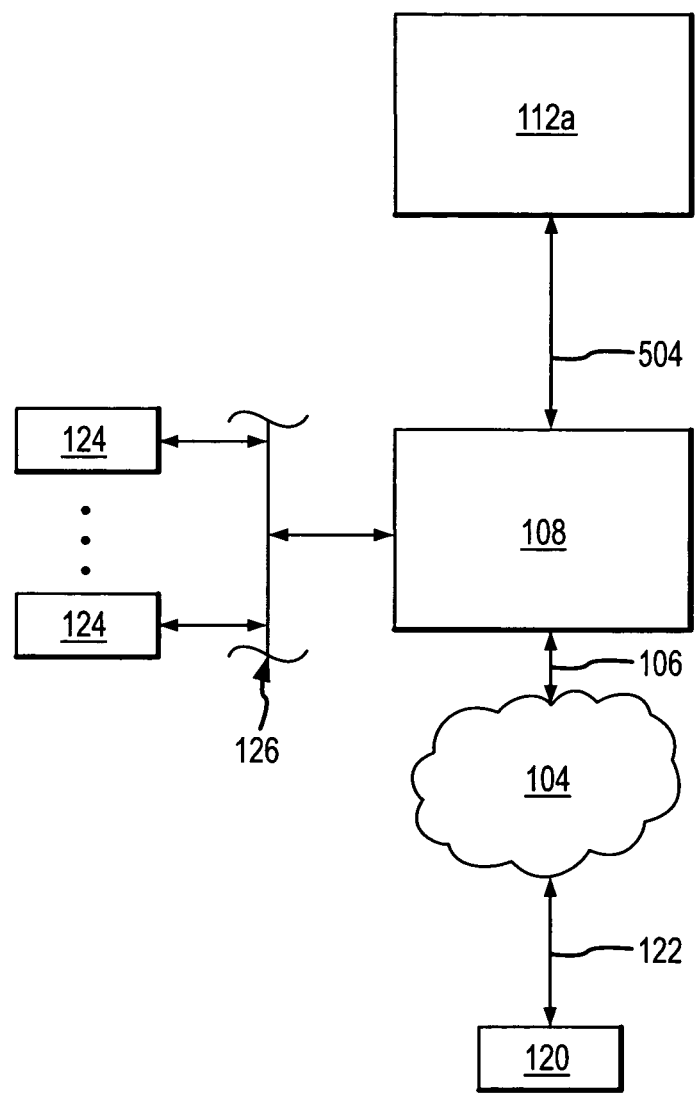
FIG. 5 depicts a communication system with a server sharing an endpoint identifier with at least one communication device in accordance with embodiments of the present invention.

With reference to FIG. 5 a fourth configuration of communication system elements will be described in accordance with at least some embodiments of the present invention. A single application server 112a may be connected to the switch 108 via a communication line 504. The application server 112a registers with the switch using the same endpoint identifier that is used by the agent communication device 124. As previously noted, this allows the application server 112a to receive data from the switch while appearing transparent to other parties connected to the switch. This allows the switch 108 to automatically send all media to the application that is being sent to the agent communication device 124. Also, since the application server 112a shares the endpoint identifier with the communication device 124, the application server 112a does not count toward the conference limit by using another endpoint identifier.

Figure 6:
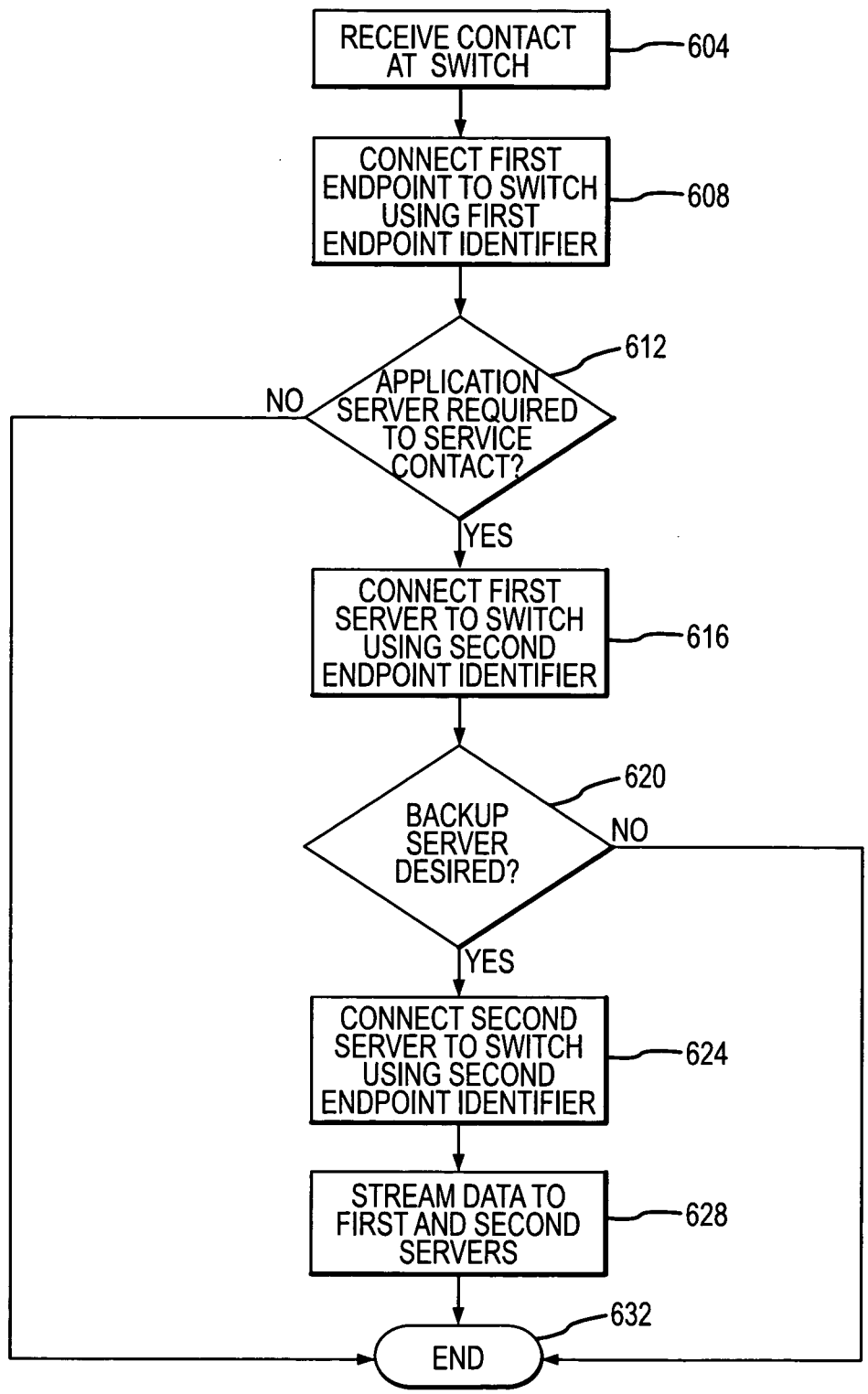
FIG. 6 is a flow diagram depicting a method of sharing endpoint identifiers in accordance with embodiments of the present invention.

With reference now to FIG. 6 a method of sharing endpoint identifiers in accordance with at least some embodiments of the present invention. The method begins when a contact is received at the switch 108 (step 604). The contact is generally sent from an external communication endpoint, however the endpoint may also include a resource request or task that is to be executed by the application server 112. In general however, the contact includes a real-time communication that warrants the service of a contact center agent. The switch 108 then allocates an endpoint identifier for the communication device associated with the contact. After the contact is received, an agent is chosen from an available pool of agents and is assigned to the contact. Once chosen, the agent's communication device 124 is connected to the switch 108 using a first endpoint identifier (e.g., an extension for an internal communication device) (step 608).

In some circumstances only an agent may be needed to service a received contact. However, in most contact center scenarios a received contact is first serviced by an automated response unit like an IVR, a video response unit, a text response unit, or the like. The automated response unit helps gather information that can be used by the contact center agent when he/she begins servicing the contact. Of course, other server-enabled applications may be used to service a contact in addition to or instead of an automated response application.

In step 612 it is determined if a server application will be required to service the contact. In the event that no application server is required to service the contact, then the method ends at step 632 and the contact center agent is allowed to service the contact without any assistance from an application server. However, in the event that an application server will be required, then the first application server 112a is connected to the switch 108 using a second endpoint identifier (step 616). As noted above, the second endpoint identifier may be the same as or different from the first endpoint identifier depending upon the application and its intended use. The first application server 112a may connect directly to the switch 108 or may be connected to the switch 108 through an intermediate server.

In step 620, it is determined if a backup server is desired. The backup server generally provides a redundant option for the first application server 112a in the event that the first application server 112a fails or otherwise becomes unable to handle the load. If no back up server is required, then the method skips to step 632 and ends with the first application server 112a and the contact center agent servicing the contact. If at least one backup server is desired, then the second server is connected to the switch 108 using the second endpoint identifier (step 624). Generally, the second server connected to the switch 108 is the second application server 112b that serves as the backup to the first application server 112a. However, the second server connected to the switch 108 may be a second intermediate server that connects the first application server 112a to the switch 108.

Assuming the second server connected to the switch 108 is the second application server 112b, both the first application server 112a and the second application server 112b are registered with the switch by the same endpoint identifier. With both servers registered with the switch 108 by the same endpoint identifier, the switch 108 can stream data to the first and second servers 112a and 112b at the same time (step 628). The data sent to the first and second application servers 112a and 112b can include streaming media or RTP data as well as control data.

As noted above, this allows the second server 112b to remain in synchronization with the first application server 112a without requiring any data mirroring technologies. After the first and second application servers 112a and 112b begin to receive data from the switch 108 the servers and contact center agent are allowed to service the contact and the method ends in step 632.

In accordance with an alternative embodiment of the present invention, the application servers 112 do not need to wait for a contact to be received before they are registered with the switch 108. Rather, each application server 112 may register with the switch 108 at start up, and automatically receive audio from the switch 108 every time a call is received at an agent communication device 124. Such applications that might be registered upon start up might include call-recording applications. The call-recording application can be in a ready state as it is continuously registered with the switch 108 and only needs to start recording when a call is received and/or sent by an agent associated with an agent communication device 124.

As can be appreciated by one of skill in the art, if more than one backup server is desired, then each backup server may register with the switch 108 using the second endpoint identifier. This allows a plurality of duplicated servers to remain in synchronization with each other and provides a higher level of redundancy.

Figure 7:
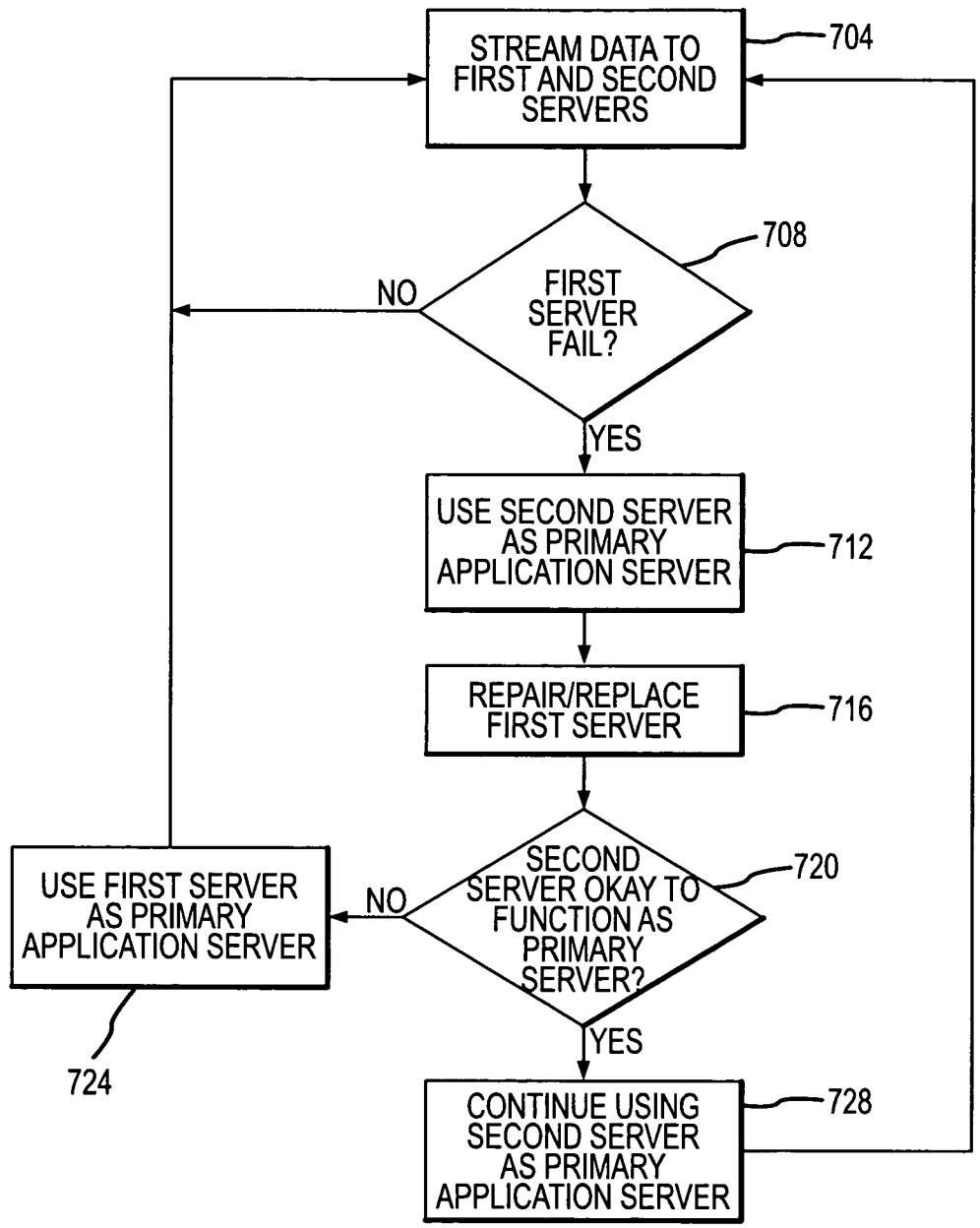
FIG. 7 is a flow diagram depicting a method of providing a high availability server application in accordance with embodiments of the present invention.

With reference now to FIG. 7, a method of providing a high availability server-enabled application will be described in accordance with embodiments of the present invention. The method begins with the switch 108 streaming data to at least a first and second application server 112a and 112b (step 704). The data may be sent directly to the application servers in one embodiment, or may be sent through an intermediate server before it is provided to the application server in another embodiment. Generally, the first application server 112a is designated to fulfill the role of the primary server (i.e., the first server 112a provides data back to the switch 108 if warranted and further actively employs the necessary applications associated with the server). The first application server 112a continues to function as the primary server until it is determined that the first application server 112a has failed (step 708). A failure of the first application server 112a may include a hard failure like a power outage or a server crash. Alternatively, the first application server 112a may become overloaded with the incoming contact volume and may not be able to service all contacts in an efficient manner. Other situations can be imagined where the first application server 112a can be considered failing. The identification of a failure may be made by the switch 108 realizing that the first application server 112a has lost its connection or its power. The switch 108 or another element may also be monitoring the load on the first application server 112a to determine if it is reaching a load capacity. Alternatively, the first application server 112a may be self-monitoring and may be equipped to send out a notification that it is not functioning properly.

The notification of failure is ultimately relayed to the second application server 112b. When the second application server 112b receives such a notification it begins functioning as the primary server (step 712). In some embodiments, the second application server 112b may be functioning just like a primary server even when the first application server 112a is functioning as the primary server. In other words, two servers may be functioning the same way and when one fails the other continues to function as the primary server. For example, both servers 112 may record an interaction between a customer and an agent and if one server fails the other may continue to record the interaction. Additionally, both servers may be generating responses for the customer but only the primary server has a sending token and therefore is the only server that the switch 108 is accepting data from.

In an alternative embodiment, the second application server 112b may receive all of the control data from the switch 108 and may stay updated with what the first application server 112a is doing but may purge any superfluous data from memory while the first application server 112a is functioning properly. Then when the second application server 112b receives notification that the first application server 112a has failed, it may begin fully interacting with the switch 108 to provide the required application.

After the second application server 112b assumes responsibilities of the primary server, the first application server 112a is repaired/replaced depending upon the type of failure incurred (step 716). If the first application server 112a simply needed time to processes certain tasks, then the "repair" of the first application server 112a may only require allowing the server to process the tasks. On the other hand, the server may have crashed or had a power outage that requires either a replacement of parts of the server or a replacement of the entire server. After the first application server 112a has been repaired/replaced, it is determined if it is okay to allow the second application server 112b to function as the primary server (step 720). There may be instances where the second application server 112b was purchased under an agreement whereby it could only be used for backup purposes and thus was purchased at a reduced rate. In this situation it may not be acceptable to allow the second application server 112b to continue functioning as the primary server. However, there may be other situations where it is okay to allow the second application server 112b to function as the primary server. If it is not okay to allow the second application server 112b to function as the primary server, then the first server is restored as the primary server and the second application server 112b resumes the backup server responsibilities (step 724). Alternatively, if it is okay to allow the second application server 112b to continue functioning as the primary server, then the second application server 112b is used as the primary server and the first application server 112a is used as the backup server (step 728).

It should be noted that even though the method described above was in relation to an application server failing the invention is not limited to reducing the risk of such failures. In accordance with at least one embodiment, an intermediate server could be functioning as the primary intermediate server until it fails or otherwise becomes overloaded. Once this event occurs, a backup intermediate server could assume the primary intermediate server role until the former primary intermediate server has been repaired/replaced. Meanwhile the backup intermediate server may send data to a different application server or may choose to continue sending the data to the same application server that the former primary intermediate server was sending data to. Therefore, assuming that the servers are configured properly, the failure of an intermediate server may not necessitate a role switch between applications servers.

Figure 8:
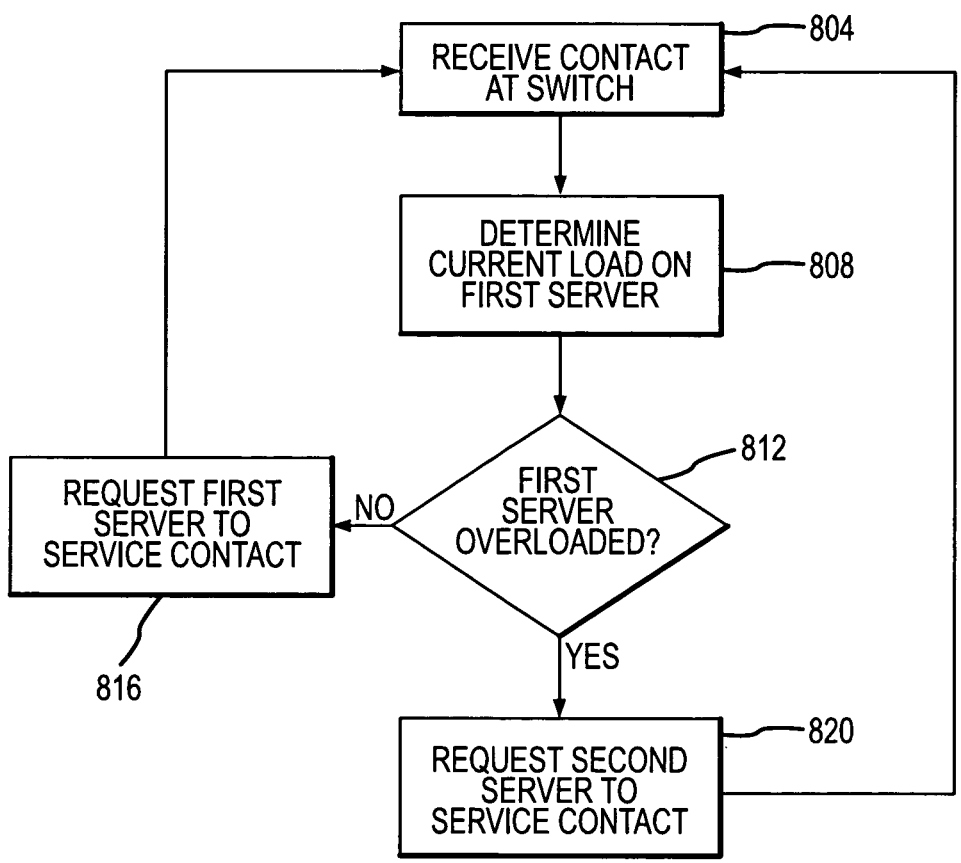
FIG. 8 is a flow diagram depicting a method for determining load on a server.

With reference now to FIG. 8, a method of load balancing between servers sharing an endpoint identifier will be described in accordance with at least some embodiments of the present invention. Initially, the switch 108 receives a contact or work item (step 804). After receiving the contact, the switch 108 determines what the current load is on the first server (step 808). Current load information may be received from the first server upon a query. Alternatively, the current load information may be determined by referencing a table maintaining server load information. By determining the current load information for the first server, the switch 108 determines if the first server is overloaded (step 812). The threshold for determining if the first server is overloaded may simply be if the first server is operating at or above a certain percentage of maximum capacity. Alternatively, if the number of work items currently being processed by a server exceeds a particular work item threshold, then the server may be determined to be overloaded.

In the event that the first server is not overloaded, then the switch sends a request to the first server to service the contact (step 816). In most cases, event data and other control data is sent to both the first and second severs or at least the first and second intermediate servers 308 connecting application servers 112 to the switch 108 simultaneously. The request for service may be sent in the form of a server marker that identifies which server is supposed to service the contact and which server is to remain as the backup server. This allows the identified primary server (i.e., the first server if it is not overloaded) to actively serve the contact while the secondary server can monitor the contact and events related thereto until it is required to serve the contact. However, if the first server is determined to be overloaded then the second server is requested to be the primary server for the received contact. This allows the first server to process contacts that it has already received while the second server processes the current contact.

In accordance with at least some embodiments of the present invention a hot switch and/or a cold switch between primary and backup servers may be enabled with the high availability applications described above. For example, a backup server does not necessarily need to wait until a primary server has failed before it assumes the role of the primary server. Rather, the switch of roles can be carried out preemptively. Load balancing may be executed by the servers on their own through the use of pointers to data containers or through the selective transmission of data containers between servers. Data containers and their uses are described in further detail in U.S. patent application Ser. No. 11/243,436 to Kalavar, the entire disclosure of which is hereby incorporated herein by this reference.

In alternative embodiments, the servers may agree upon a predetermined periodicity of contact processing switching. For instance, a first server may service the first ten received contacts then a second server will service the following ten received contacts. This switching of roles can be carried out by the servers individually or in cooperation with the switch 108.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   connecting a first contact, wherein the first contact is a real-time communication that warrants service from a human contact center agent at an agent communication device, with at least a first external communication device through a switch, wherein the first contact is a voice or video call between the human agent and a customer;
   the switch forwarding first control data associated with the first contact to first and second servers and to the agent communication device, wherein the first control data associated with the first contact is forwarded to the first and second server and the agent communication device simultaneously, wherein the first server and the second server and the agent communication device are registered, by the switch, with a single common endpoint identifier, and wherein the first and second servers are registered with the switch upon receipt of the first contact;
   sending, by the switch, a single data stream associated with the first contact to each of the first and second servers and the agent communication device, wherein the single data stream is a voice or video data stream for the voice or video call between the human agent and the customer;
   receiving, by a media application, on each of the first and second servers, the single data stream;
   the media application, on each of the first and second servers, processing simultaneously the single data stream to produce second data, wherein the processing is performed on each of the first and second servers; and
   the first server providing the second data back to the first communication device.

2. The method of claim 1, further comprising:
   registering a first server with the switch using a first endpoint identifier; and registering a second server with the switch using the first endpoint identifier while the first server is registered with the switch using the first endpoint identifier.

3. The method of claim 2, further comprising registering a third server with the switch using the first endpoint identifier while at least one of the first and second server is registered with the switch using the first endpoint identifier.

4. The method of claim 1, wherein the at least a first communication device is connected to the switch using the common endpoint identifier.

5. The method of claim 1, wherein the at least a first communication device is connected to the switch using a second endpoint identifier that differs from the common endpoint identifier.

6. The method of claim 1, further comprising the first and second servers running at least a first application for servicing the first contact, wherein the at least a first application comprises the media application, and wherein both servers employ their respective first application to process the received data stream.

7. The method of claim 6, wherein the single data stream comprises a voice stream, wherein the at least a first application run by the first and second servers is the same application, and wherein the at least a first application run by the first and second servers is a voice application.

8. The method of claim 7, wherein the at least a first application comprises at least one of a recording application, an automated response application, a signaling application, a real-time media application, and an emergency application.

9. The method of claim 1, further comprising:
the first server functioning as a primary server;
the first server at least partially failing to fulfill the role as the primary server; and
the second server switching from a backup server role to the primary server role.

10. The method of claim 9, further comprising detecting that the first server is at least partially failing to fulfill the role as the primary server prior to switching the second server from the backup server role to the primary server role.

11. The method of claim 1, wherein the common endpoint identifier comprises at least one of an extension and a Uniform Resource Identifier.

12. The method of claim 1, wherein the first server is functioning as a primary server when the first contact is received, the method further comprising:
analyzing a current load for the first server;
determining that the first server has a current load exceeding a predetermined threshold; and
requesting the second server to function as the primary server and service the first contact by sending a token to the second server, the token having been previously held by the first server, wherein the token provides the second server with permissions to provide data back to the switch and upon relinquishing the token to the second server the first server loses permissions to provide data back to the switch.

13. The method of claim 1, wherein data in the single data stream is not mirrored between the first server and the second server.

14. A non-transitory computer readable medium comprising processor executable instructions operable, when executed, to perform the method of claim 1.

15. A communication system, comprising:
a first application server operable to function as a primary server, the first application server comprising a first media application;
a second application server operable to function as a backup server to the first application server, the second application server comprising a second media application;
a switch simultaneously connected to the first application server, the second application server, and an agent communication device with a first endpoint identifier, the switch operable to:
receive a data stream from an external communication device, wherein the data stream is associated with a real-time communication that warrants service from the human contact center agent, wherein the data stream is a voice or video data stream for a voice or video call between the human agent and a customer;
in response to the receipt of the data stream, register the first and second application servers and the agent communication device;
generate a first data stream split, a second data stream split, and a third data stream split from the data stream, wherein the first data stream split, the second data stream split, and the third data stream split are copies of the data stream, and
send one of the first data stream split and the second data stream split to each of the first and second application servers, wherein the third data stream split is sent to the agent communication device, and wherein the first application server and the second application server simultaneously process the respective data stream split.

16. The system of claim 15, wherein data is transferred from the switch to the first and second application servers at the same time.

17. The system of claim 16, wherein data comprises at least one of downlink call control data, device control messages, and streaming media.

18. The system of claim 15, further comprising a second agent communication device, the second agent communication device connected to the switch via a second endpoint identifier.

19. The system of claim 18, wherein the first endpoint identifier is different from the second endpoint identifier.

20. The system of claim 18, wherein the first endpoint identifier is the same as the second endpoint identifier.

21. The system of claim 15, wherein the first application server comprises a first Internet Protocol (IP) address and wherein the second application server comprises a second IP address that differs from the first IP address.

22. The system of claim 15, further comprising a first and second intermediate server, wherein the first intermediate server connects the first application server to the switch, and wherein the second intermediate server connects the second application server to the switch.

23. The system of claim 22, wherein the first intermediate server further connects the second application server to the switch, wherein the second intermediate server further connects the first application server to the switch, wherein streaming media transferred between the switch and one of the first and second application servers bypasses the first and second intermediate servers, and wherein control data transferred between the switch and one of the first and second application servers passes through one of the first and second intermediate servers and is converted by one of the first and second intermediate servers.

24. The system of claim 15, wherein each of the first and second application servers are registered, by the switch, with a first endpoint identifier.

* * * * *